Sept 3, 1957 R. L. WALLACE, JR 2,805,407

MAGNETIC REGISTER

Filed July 30, 1953 2 Sheets-Sheet 1

INVENTOR
R. L. WALLACE JR.
BY Harry C. Hart
ATTORNEY

MAGNETIC REGISTER

Filed July 30, 1953 2 Sheets-Sheet 2

INVENTOR
R. L. WALLACE JR.
BY Harry C Hart
ATTORNEY

United States Patent Office 2,805,407
Patented Sept. 3, 1957

2,805,407

MAGNETIC REGISTER

Robert L. Wallace, Jr., Plainfield, N. J., assignor to Bell Telephone Laboratories, Incorporated, New York, N. Y., a corporation of New York Application July 30, 1953, Serial No. 371,255

8 Claims. (Cl. 340—17)

This invention relates to the storage of information. It has for its principal object the provision of an information storage system or register of accuracy and fidelity. In the new system the registration is substantially proportional to the signal registered, which may have any one of a large number of different magnitudes. The registration, furthermore, is readily erasable at will but is otherwise substantially permanent.

Another object is to recover or reproduce the stored information without erasing it.

Another object is to substitute stored information of one value for stored information of a previous value without resorting to an intermediate step of erasure.

Another object is to provide a system for the distribution of time division multiplex signals to their respective destinations in a fashion which is not dependent for its accuracy on its speed of operation.

Systems are known in which the properties of magnetic materials are turned to account in the construction of an information register. In such systems the desired permanence of the record, subject to erasure at will, is secured through the hysteretic behaviour of high coercivity materials. But, because of this very hysteretic behaviour, the relation between the information to be recorded and the record thereof in the form of a magnetic condition internal to the material is highly nonlinear. To minimize the undesired effects of such nonlinearity, it has been proposed to bias the high coercivity material to saturation prior to the making of each new record. This calls for a separate saturation bias step which requires both special apparatus and finite time. Furthermore, this mode of preparing the material for receiving each new record does not succeed in establishing a fully linear relation between the information to be recorded and the record; in other words, the record so formed is never quite what is expected and intended.

It is known in the art of sound recording on a moving magnetic medium that the employment of a high frequency alternating bias in combination with the signal to be recorded offers marked advantages. This technique, however, cannot be applied to a magnetic register in which there is no movement of the recording medium. Accordingly, it is a more particular object of the present invention to obtain, in the case of a fixed magnetic register, the advantages which are secured with a moving magnetic medium by the employment of a high frequency bias.

According to the invention, therefore, there is provided a composite core of which a part, and preferably the larger part, is of highly permeable ferromagnetic material while the smaller part, which may comprise an insert in a gap of the larger part, is of high coercivity material. In one form, the core has the configuration of two loops, the part containing the gap and the insert being common. A recording winding links this common part and the high coercivity insert. A signal to be recorded, which may have any desired value, is first combined with an auxiliary signal which meets certain specific requirements. The first such requirement is that it should comprise a high frequency oscillation, and by this it is meant that it contains a substantial number of full oscillation cycles, e. g., twenty or more, in the span of the shortest signal to be recorded. Second, at the commencement of this auxiliary signal or within a few cycles thereafter, it attains an amplitude which is at least equal to or greater than the amplitude of the signal to be recorded. Third, it decays or dies away from this maximum amplitude to an amplitude which is many times smaller than the signal to be recorded, and preferably to substantially zero amplitude, while the signal to be recorded endures. This auxiliary signal may conveniently be generated by an electronic oscillator which is normally disabled and which is instantaneously enabled at the commencement of the signal to be recorded and disabled well before its termination, so that its oscillations may die away while the signal is still extant. After this decaying high frequency bias signal has been combined with the signal to be recorded, the resulting composite signal is applied to the recording winding, where it acts to establish the desired record or registration.

The information recorded may be recovered, reproduced or "read out" in a variety of different ways but it is preferred to provide a special recovery winding elsewhere on the permeable part of the core and to supply it with a carrier wave which may be of the same frequency as that of the decaying bias oscillation and may be derived from the same source. In the event that the two-loop core of the preferred form is employed, this recovery winding preferably comprises two like coils which link oppositely disposed portions of the permeable part of the core so that in the absence of recorded information, the magnetic flux due to current in these windings is balanced in the gap and in the high coercivity insert.

Application of the carrier signal to the recovery windings modifies the ferromagnetic path for the flux due to magnetization of the high coercivity insert and so changes this flux. Such a change of flux is manifested as a signal developed across a winding which links the core part in which the flux changes. The recording winding is disposed in this fashion so that an output signal is generated in it and may, if desired, be utilized. Such an arrangement calls for switching apparatus which alternately connects this winding to the source of information to be recorded and to a load. It is preferred, therefore, in the interests of simplicity, to provide this part of the core with a further winding which may be termed a load winding. The recording winding may then remain always connected to the source and the load winding always connected to the load.

With such a system, erasure of a registered signal reduces merely to the recording of a signal of zero amplitude in combination with the decaying auxiliary high frequency signal heretofore described. Furthermore, because of the characteristics of the auxiliary signal, the process of recording a signal of a new value automatically erases the predecessor recorded signal. Thus, in one useful embodiment of the invention, signals of successive values may be recorded at will at high substitution rates or at low, periodically or aperiodically, as may be desired, and each one endures without change or decay until its successor is substituted for it. Meantime, application of the carrier wave to the recovery windings produces continuously an output which is accurately proportional to the most recent record. This endures as long as the recorded information remains unchanged and changes immediately to the new value corresponding to the newly recorded information as soon as the latter has been substituted for the former.

The core may also take the form of a hollow torus, in turn formed of two endless channels of permeable material joined together by way of one or more rings of high coercivity material. The recording and load windings may be laid in the endless annular passage inside of this torus while the carrier windings are wound outside of the core, each turn being threaded through its central hole. With this construction the turns of the inner windings are substantially normal to the turns of the outer windings and therefore the magnetic flux associated with or generated by either of these windings lies in a plane such that it does not link the turns of the other winding. In other words, these fluxes are mutually orthogonal. Thus, the flux due to the outer or carrier windings travels parallel with the high coercivity insert instead of normal to it. With this construction it is no longer necessary to exercise care in the balancing of the carrier windings, the orthogonality of the flux serving the same purpose.

The invention finds application in many situations. For example, it offers an improved substitute for the sample-holding condenser which is now common in systems for the distribution of time division telephone signals. Such a condenser is open to the objection that, because of unavoidable leakage, the charge on the condenser inevitably decays with time so that the record is ephemeral and must therefore be recovered with great promptness after it has been made if it is to have any valuable degree of proportionality to the recorded signal.

The invention will be fully apprehended from the following detailed description of a preferred embodiment thereof taken in connection with the appended drawings in which.

Figure 1:
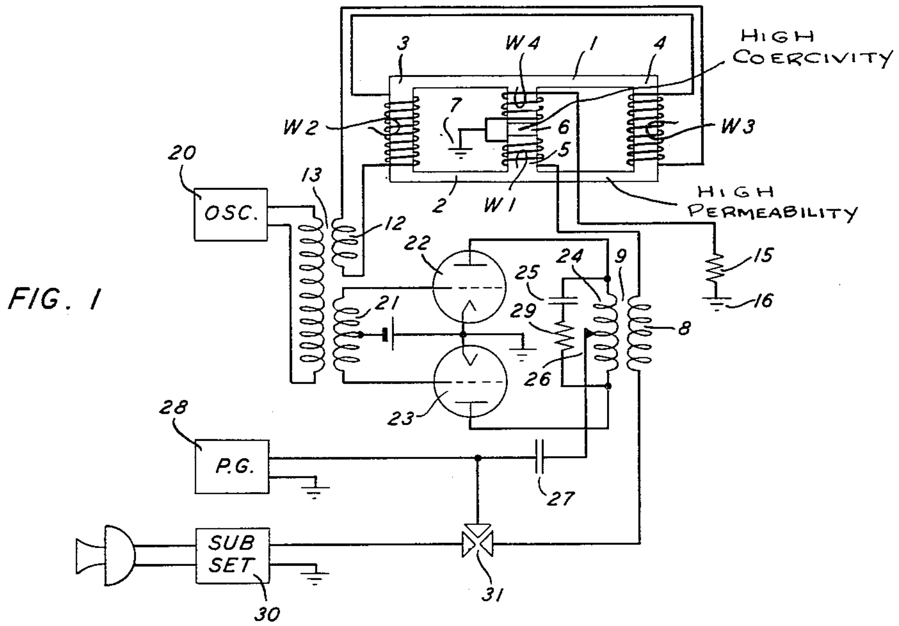
Fig. 1 is a schematic circuit diagram showing a single register in accordance with the invention.

Referring now to the drawings, Fig. 1 shows a core comprising two horizontal members 1, 2 interconnected at their ends by two extreme vertical legs 3, 4 and at their centers by a third leg 5 which, however, is broken by a gap containing an insert 6. The insert is of a material of high coercivity; i. e., it is one having permanent magnetic properties in high degree. Moreover it is one which at the same time is readily magnetizable and demagnetizable. Many materials having these properties are available, an excellent one for the purpose being an alloy of iron, vanadium and cobalt known as vicalloy. With the exception of the insert, all parts of the core are preferably of highly permeable ferromagnetic material such as soft iron.

A first coil winding $W_1$ links the center leg 5 and is connected between ground 7 and the secondary winding 8 of a transformer 9. A second and a third winding $W_2$, $W_3$ which preferably contain like numbers of turns and are symmetrically disposed on the extreme legs 3, 4 are connected to be supplied with current from the secondary winding 12 of a transformer 13. They may be connected in series or in parallel as desired, the series connection being preferred because it operates automatically to ensure that the currents in these windings shall be alike in magnitude. However they be interconnected, these windings should be wound and poled in such a way that the fluxes induced in the core shall be alike in magnitude and in the same angular direction through the horizontal members 1, 2 and extreme legs 3, 4. Thus, in the absence of a flux otherwise induced in the center leg 5, the fluxes due to the second and third windings $W_2$, $W_3$ are balanced in the center leg 5.

A fourth or load winding $W_4$ links the center leg and is connected through a load resistor 15 to ground at 7 and 16.

An oscillator 20 of any desired variety supplies oscillations of an appropriate high frequency and of substantial amplitude by way of a secondary winding 21 of the transformer 13 to the grids of the tubes 22, 23 of a push-pull amplifier between whose anodes is connected a resonant circuit comprising a coil 24 and a condenser 25. The coil, which may be the primary winding of an output transformer 9, is provided with a center tap 26 and this center tap is connected by way of a condenser 27 to the output terminal of a pulse generator 28.

Oscillations of appropriate high frequency and substantial amplitude are thus continuously applied to the push-pull amplifier. This amplifier does not normally transmit them because in the absence of an output from the pulse generator 28 it is disabled by virtue of having no operating anode voltage. However, upon the occurrence of a pulse from the pulse generator 28, this is applied, preferably by way of the condenser 27, to the center tap 26 of the coil 24 and brings the anodes of both tubes 22, 23 into operating condition. Immediately, however, due to the impedance interposed by the condenser 27, this anode voltage commences to fall and the amplification of the tubes falls with it. After a further brief interval, the pulse output of the pulse generator 28 ceases entirely and the amplifier is once more disabled. During this brief period of operation, however, it has transferred the output of the oscillator 20 to the tuned circuit 24, 25 so that voltage oscillations appear across the latter which are larger in amplitude than those at the output terminals of the oscillator 20 by virtue of the amplification contributed by the tubes 22, 23. Upon disablement of the amplifier, these voltage oscillations are not immediately reduced to zero. Rather, their amplitude decays exponentially. Their rate of decay may be adjusted to the desired value by inclusion of an appropriate amount of resistance 29 at a suitable point of the tuned circuit. In accordance with the invention this rate is to be so adjusted that these oscillations, having at first been of an amplitude in excess of that of the signal to be recorded, die away during the existence of this signal to an amplitude which is very small in comparison with the signal amplitude. These decaying oscillations are applied by way of the transformer 9 to the recording winding $W_1$.

A signal to be registered, here illustrated as the output of a telephone subscriber's set 30, is applied by way of a switch 31 which is normally open, and in series with the secondary winding 8 of the output transformer 9 to the recording winding $W_1$ on the core. The switch, which may be of any desired variety, is illustrated by the convention in which two opposed arrowheads represent its conduction terminals while the third arrowhead represents a control terminal. The fact that the conduction path through the switch is normally disestablished is indicated by the separation of the conduction terminal arrowheads. Application of a signal, in this case derived from a pulse generator 28, to the control terminal actuates the latter and in the conventional illustration this actuation results in advancing the third arrowhead into engagement with the conduction terminal arrowheads so as to establish a current path between them.

At the same instant that the pulse output of the generator 28 enables the push-pull amplifier 22, 23, it also establishes a conduction path for an amplitude sample of the signal output of the subscriber's set 30 by way of the switch 31 and the secondary winding 8 of the transformer 9 to the recording winding $W_1$. This sample endures while the switch 31 is closed, namely, for the period during which the sampling pulse output of the generator 28 endures. Thus, the signal sample and the decaying high frequency oscillation are additively combined and applied in combination to the recording winding $W_1$. There they establish a magnetic flux through the center leg 5 of the core and through the high coercivity insert 6 which at first oscillates with large amplitude and at a high frequency about a value determined by the magnitude of the signal sample, the flux oscillations commencing immediately to decay in amplitude while retaining the same mean value and terminating as oscillations of minute and therefore negligible amplitude about this mean signal-determined value. This process results in the establishment of a magnetic polarization condition in the insert 6 which is very accurately proportional to the magnitude of this signal sample. By virtue of the characteristics of the insert 6, this magnetic condition is unaffected by ambient temperatures, humidity and other unavoidable effects and thus retains its value without change or decay until it is desired to erase or otherwise change it.

Figure 2:
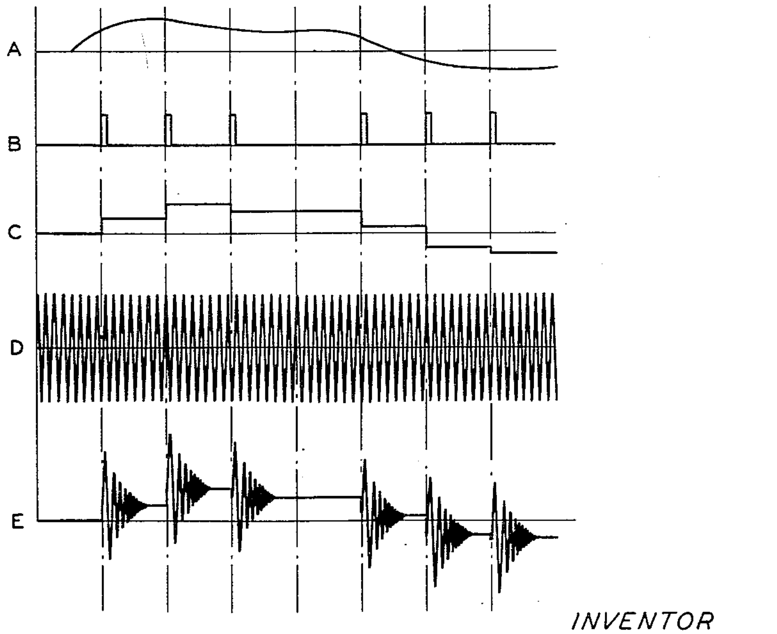
Fig. 2 shows a group of wave form diagrams of assistance in the explanation of the mode of operation of the invention.

In Fig. 2, curve A shows a wave form of a representative portion of a voice signal to be recorded. The curve B shows a succession of short sampling pulses. The latter may be periodic or aperiodic. For the sake of generality, the sequence is shown as comprising a group of equally spaced pulses from which one is missing. The curve C shows the result of employing each of the sampling pulses to take a sample of the signal wave of cure A and hold it until the ensuing sample is taken. Curve D shows a high frequency wave of constant large amplitude which may represent the output of the oscillator 20. The curve E shows the superposition on each of the signal samples of the curve C of a highly damped wave of the frequency of the curve D, each commencing at the inception of the signal sample and falling to a negligible amplitude before its termination.

Meanwhile, and independently of the process of registering or recording the signal by the magnetization of the insert, the output of the carrier frequency oscillator 20 is continuously applied by way of a secondary winding 12 of the transformer 13 to the second and third coils $W_2$, $W_3$ which, as stated above, are so wound that their fluxes are balanced in the center leg 5 of the core, being continuous throughout the horizontal legs 1, 2 and the extreme vertical legs 3, 4. This flux acts to modify the permeability of the core as a whole at the high frequency rate of the carrier voltage. This in turn varies the reluctance of the magnetic path for the flux due to the magnetized insert 6 and to do so at a rapid rate. In accordance with well known electromagnetic principles, the electromotive force generated in fourth or load winding $W_4$ is proportional to the rate of change of the magnetic flux through this winding. In consequence of the geometry of the core and of the high carrier frequency, a comparatively small amount of magnetization in the insert 6 is thus reflected in a comparatively large induced electromotive force in the load winding $W_4$. The latter appears across the load resistor 15 as an alternating output signal having the frequency of the output of the oscillator 20 and an amplitude proportional to the magnetic record established in the insert 6 and therefore to the signal sample thus registered.

Figure 3:
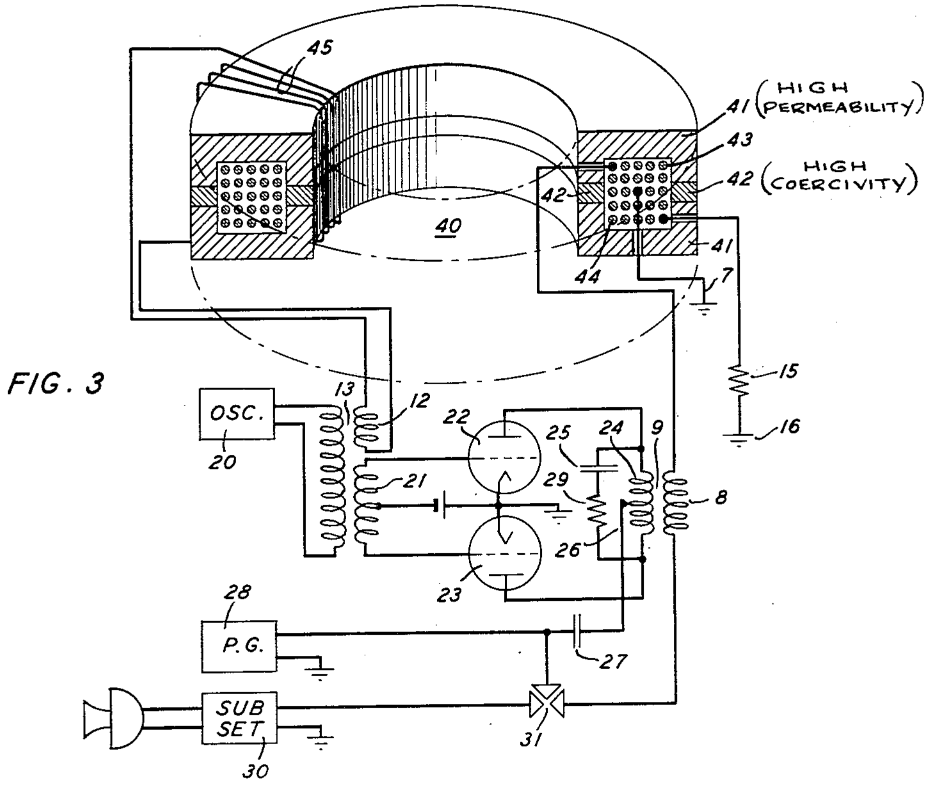
Fig. 3 shows a composite core alternative to that of Fig. 1.

Fig. 3 shows a system alternative to that of Fig. 1 wherein the core and its windings differ from the core and windings of Fig. 1 but all other elements may be the same and are identified by like reference characters. The core 40 has the form of a hollow torus, the greater part 41 of the material of which is of high permeability while an insert 42 or inserts are of material of high coercivity. These inserts, which preferably lie in the central plane of the torus, are indicated in the drawing by shading.

This core may conveniently be formed of molded comminuted material such as ferrite. The high coercivity insert 42 may, as before, be a cobalt-nickel-iron alloy such as "vicalloy."

The recording winding 43 and load winding 44 may be laid in the endless annular passage inside of this torus while another winding 45 is placed outside of it, each turn being threaded through its central hole. With this construction the turns of the inner windings 43, 44 are substantially normal to the turns of the outer winding 45 and therefore the magnetic flux associated with or generated by either of these windings lies in a plane such that it does not link the turns of the other windings. In other words, these fluxes are mutually orthogonal. Thus, the flux due to the outer or carrier winding 45 travels parallel with the high coercivity insert 42 and travels for the most part through the high permeability material 41, only a negligible flux density existing in the high coercivity material 42. To the contrary, the flux established in the core by a signal current flowing in the recording winding 43 must pass through the high coercivity material 42 and is in a direction normal to the former flux. It acts to establish a record of the signal in the form of a magnetization polarization condition in the inserts 42.

The flux due to a current of the oscillator 20 flowing in the carrier winding 45 modifies the permeability of the core at a high frequency rate so that the magnetization established in the high coercivity inserts 42 is manifested as before by the generation of an electromotive force in the load winding 44 and this appears as a voltage drop across the load resistor 15 as before.

With this construction it is no longer necessary to exercise care in balancing the carrier windings ($W_2$, $W_3$ of Fig. 1), because the orthogonality of the windings serves the same purpose.

Figure 4:
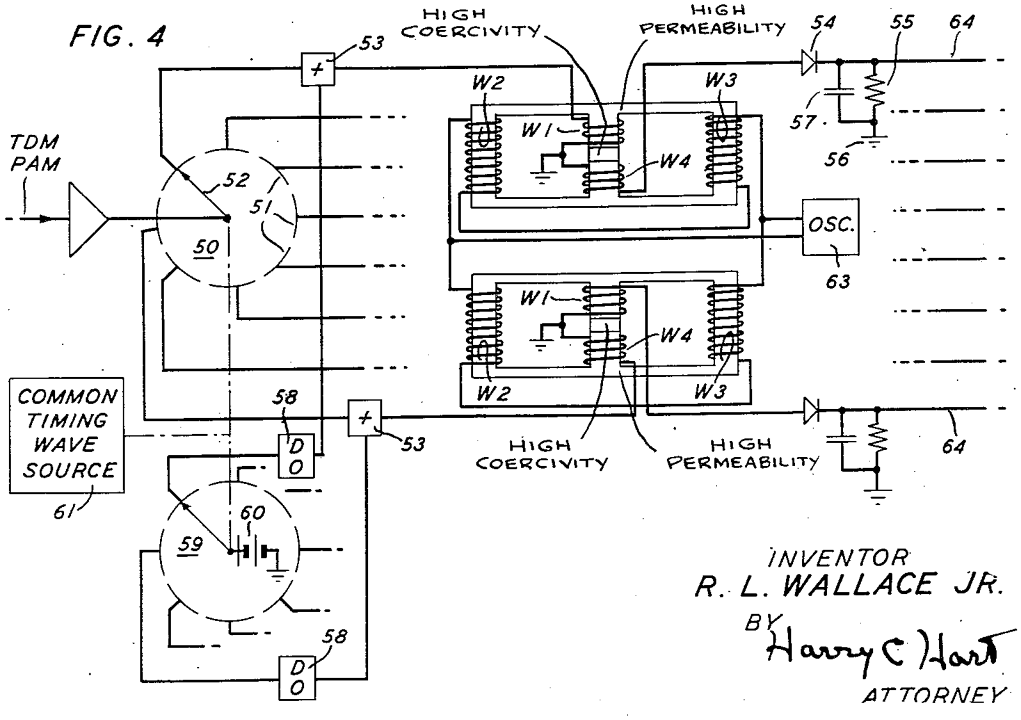
Fig. 4 is a schematic circuit diagram showing a distributor for time division telephone signals in which the speech samples of individual time division channels are stored in individual registers in accordance with the invention, each such record being then continuously recovered for distribution to its destination.

Apparatus of this character readily finds use in a system for distribution of time division multiplex signals. Such a system is schematically indicated in Fig. 4 wherein incoming time division multiplex signals, each channel being in the form of a pulse, amplitude modulated in proportion to the signal sample which it represents, are applied to a distributor which is here represented for the sake of simplicity of illustration as a commutator 50 having a plurality of segments 51 and a wiper arm 52. The incoming signals are applied by way of the wiper arm 52 to the various segments 51 in succession. The connections of the first and last segments of the group are shown, the remainder being indicated to be similar by broken lines. Thus, the first segment is connected by way of a combining element 53 to the recording winding $W_1$ of a core which may be identical with that of Fig. 1. Like Fig. 1, too, its center leg is provided with a load winding $W_4$ which is connected by way of a rectifier 54 and a load resistor 55 to ground 56. The high frequency of the oscillator of Fig. 1 is bypassed around the load resistor 55 by a condenser 57. To the combining element 53 there are also supplied decaying high frequency oscillations of the wave form heretofore described and shown in curve E of Fig. 2 which may be generated by apparatus like that of Fig. 1. For simplicity of illustration, a plurality of decaying oscillators 58 are indicated, each connected to one of the combining elements 53, and enabled in regular sequence and in synchronism with the commutator 50 by a second commutator 59 which applies the voltage of a battery 60 to these decaying oscillators 58 in rotation. The two commutators 50, 59 are driven and maintained in synchronism by a common timing wave source 61. As a result, the signal destined for each particular outgoing channel is first combined with the decaying oscillation of the invention, and then this composite signal is applied to the recording winding $W_1$ of the composite core.

Meantime, high frequency oscillations of constant amplitude, derived from an oscillator, are applied to the recovery windings $W_2$, $W_3$ of all the cores. For economy of apparatus the oscillator 63 which supplies the recovery windings $W_2$, $W_3$ may be the same unit which is employed to supply the decaying oscillations as in Fig. 1. It is shown as a separate unit in Fig. 4 only for the sake of simplicity of illustration.

With this arrangement, the signal destined for each channel is first briefly registered in the magnetizable insert of the core which is assigned to this channel, whereupon the wiper arm 52 of the distributor 50 passes on to do likewise for the next channel. Throughout the remainder of the full rotation cycle of the wiper arm 52, the signal so recorded is continuously read out or reproduced in the fashion described above in connection with Fig. 1 into the telephone line 64 for which it is destined.

Upon completion of one revolution of the commutator 50, it places another sample of the signal of the same time division channel upon the same commutator segment. This operates in combination with the decaying oscillations to establish a new magnetic condition in the insert which is now representative of this new sample. Thus, the decaying oscillation serves not only to ensure proportionality between the magnetic condition in the insert and the signal sample amplitude which it represents, but also and at the same time completely to wipe out or erase all trace of the record of the prior signal sample.

Still other uses, applications and embodiments of the invention will suggest themselves to those skilled in the art.

What is claimed is:

1. A magnetic register which comprises a ferromagnetic core having a permeable part and a high coercivity part, a winding linking said core, a source of a signal to be registered, a source of high frequency oscillations, a source of a third signal which decays within the period of the signal to be registered from a magnitude in excess of that of the signal to be registered to a magnitude much less than that of the signal to be registered, means for modulating the signal of said high frequency source by the third signal to form a modulated signal, means for combining said modulated signal with the signal to be registered to form a composite signal, and means for applying said composite signal to said winding, said winding being so disposed on said core in relation to the high coercivity part thereof as to establsh in said high coercivity part a magnetic flux due to the flow of said composite signal current through said winding, whereby said high coercivity part is retentively magnetized in proportion to the signal to be registered.

2. A magnetic register as defined in claim 1, wherein the permeable core part is formed into two loops having a common portion, said common portion including a gap, and wherein said magnetizable core part comprises an insert within said gap.

3. Apparatus as defined in claim 1 wherein the core has the form of a tubular torus defining a closed tubular magnetic path and an endless closed chamber within said path, an annular part of said core being of high coercivity material, the remainder of said core being of high permeability material, said annular part lying in a plane parallel with the plane of said endless chamber.

4. In combination with apparatus as defined in claim 1, an additional winding linking said core in noninductive relation to said first winding.

5. In combination with apparatus as defined in claim 1, an additional winding linking said core and disposed orthogonally to said first winding.

6. In combination with apparatus as defined in claim 1, an additional winding linking said core in a fashion to establish a flux in the permeable part of said core but not in the high coercivity part of said core, and means for energizing said additional winding thereby to modify the reluctance of the core to flux of the high coercivity part.

7. A magnetic register as defined in claim 1, wherein the permeable core part is formed into two loops having a common portion, said common portion including a gap and wherein said high coercivity core part is an insert in said gap, said first-named winding linking said common portion, an additional winding linking each of said two loops individually, said additional windings having like numbers of turns, and means for supplying said additional windings with like magnetizing currents thereby to establish a flux in said core which is continuous in said two loops but is balanced in said gap.

8. In combination with apparatus as defined in claim 3, an additional winding toroidally wound on the exterior of said core, said first-named winding being placed in and concentrically with said endless closed chamber, and means for supplying said additional winding with current, thereby to modify the reluctance of the core to flux of the high coercivity core part.

References Cited in the file of this patent

UNITED STATES PATENTS

| | | |
|---|---|---|
| 1,287,982 | Hartley | Dec. 17, 1918 |
| 2,659,866 | Landon | Nov. 17, 1953 |

FOREIGN PATENTS

| | | |
|---|---|---|
| 171,660 | Australia | June 25, 1952 |